(No Model.)

6 Sheets—Sheet 1.

C. O. SOBINSKI.
LINK BENDING MACHINE.

No. 287,736. Patented Oct. 30, 1883.

WITNESSES:
W. W. Hollingsworth
Edw. W. Byrn

INVENTOR:
C. O. Sobinski
BY Munn & Co.
ATTORNEYS.

(No Model.) 6 Sheets—Sheet 3.
C. O. SOBINSKI.
LINK BENDING MACHINE.

No. 287,736. Patented Oct. 30, 1883.

WITNESSES:
W. W. Hollingsworth
Edw. W. Byrn

INVENTOR:
C. O. Sobinski
BY Munn & Co
ATTORNEYS.

(No Model.) 6 Sheets—Sheet 4.
C. O. SOBINSKI.
LINK BENDING MACHINE.

No. 287,736. Patented Oct. 30, 1883.

WITNESSES:
W. W. Hollingsworth
Edw. W. Byrn

INVENTOR:
C. O. Sobinski
BY Munn & Co
ATTORNEYS.

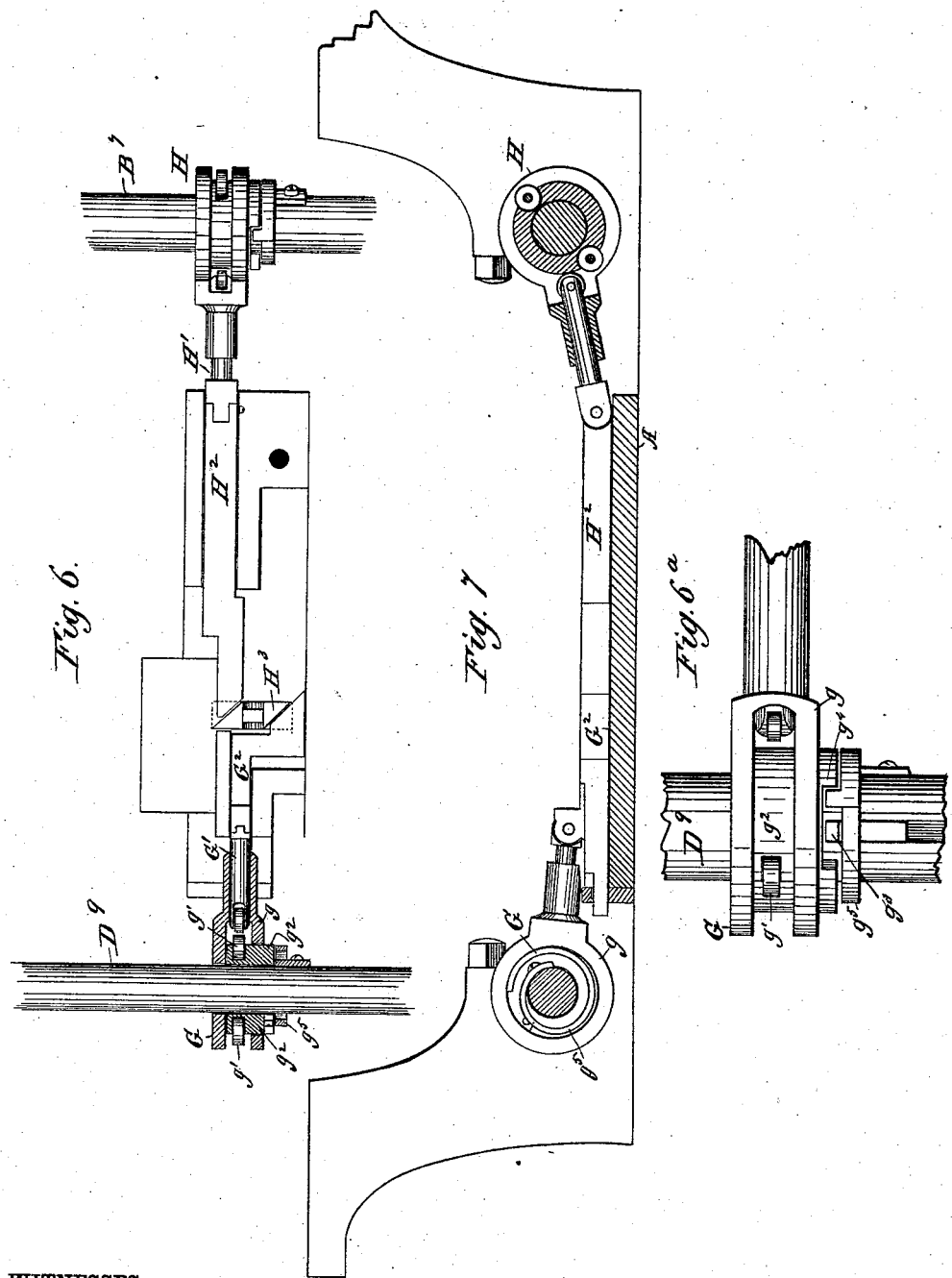

(No Model.) 6 Sheets—Sheet 6.

C. O. SOBINSKI.
LINK BENDING MACHINE.

No. 287,736. Patented Oct. 30, 1883.

WITNESSES:
W. W. Hollingsworth
Edw. W. Byrn

INVENTOR:
C. O. Sobinski
BY Munn & Co.
ATTORNEYS.

UNITED STATES PATENT OFFICE.

CHARLES O. SOBINSKI, OF ST. LOUIS, MISSOURI, ASSIGNOR OF ONE-HALF TO ANTON MEYER, OF SAME PLACE.

LINK-BENDING MACHINE.

SPECIFICATION forming part of Letters Patent No. 287,736, dated October 30, 1883.

Application filed May 5, 1883. (No model.)

*To all whom it may concern:*

Be it known that I, CHARLES O. SOBINSKI, of St. Louis, in the county of St. Louis and State of Missouri, have invented a new and useful Improvement in Link-Bending Machines; and I do hereby declare that the following is a full, clear, and exact description of the same, reference being had to the accompanying drawings, forming part of this specification, in which—

Figure 1:
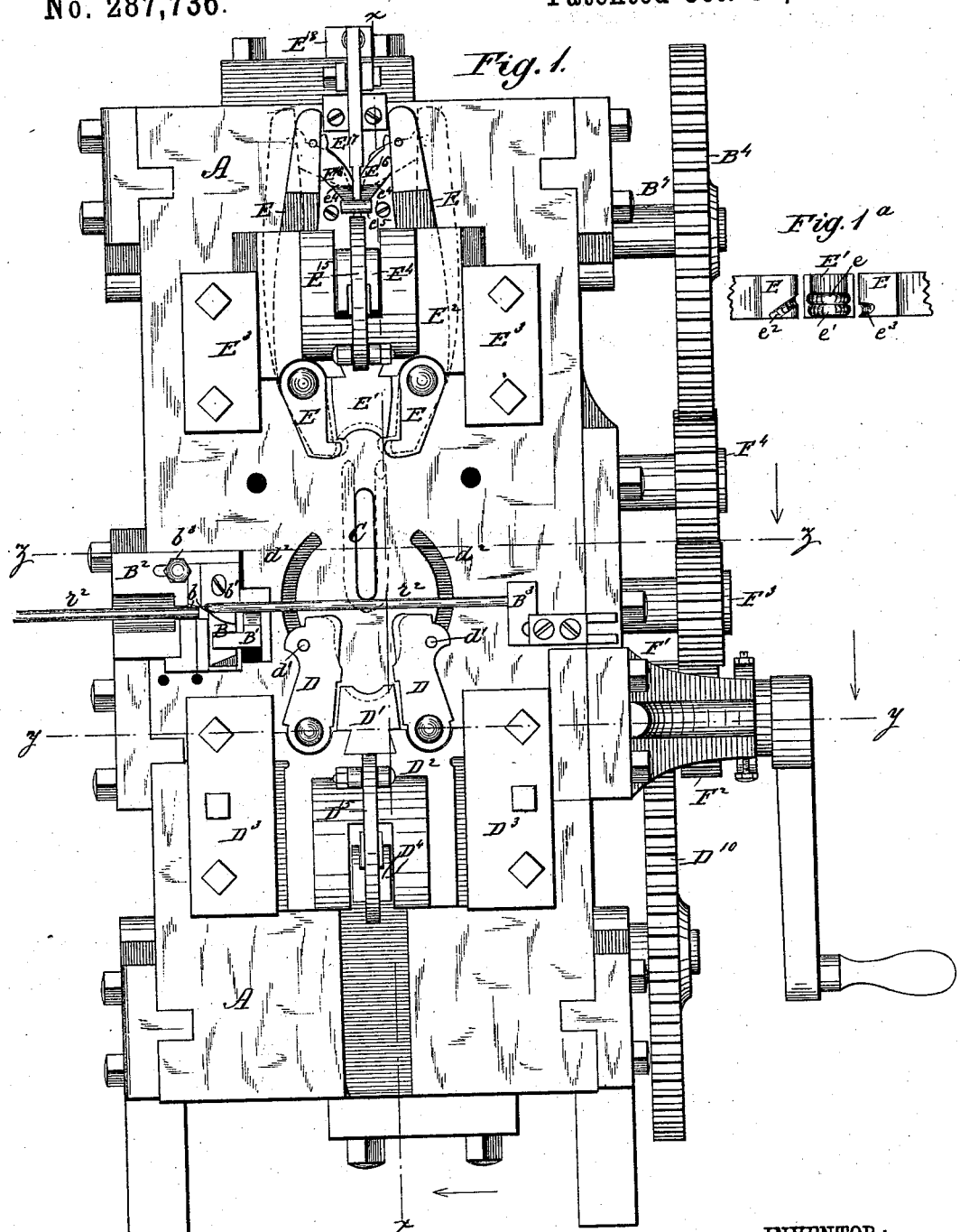
Figure 2:
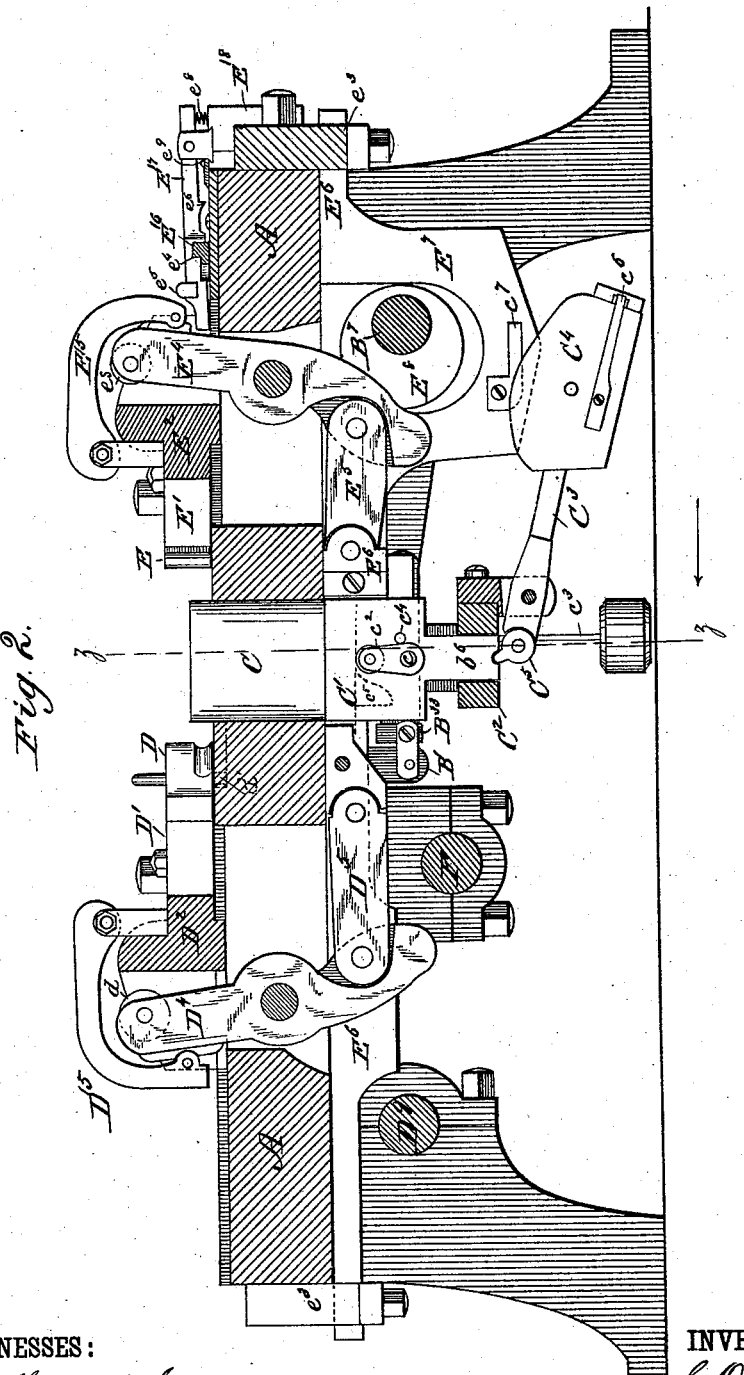
Figure 3:
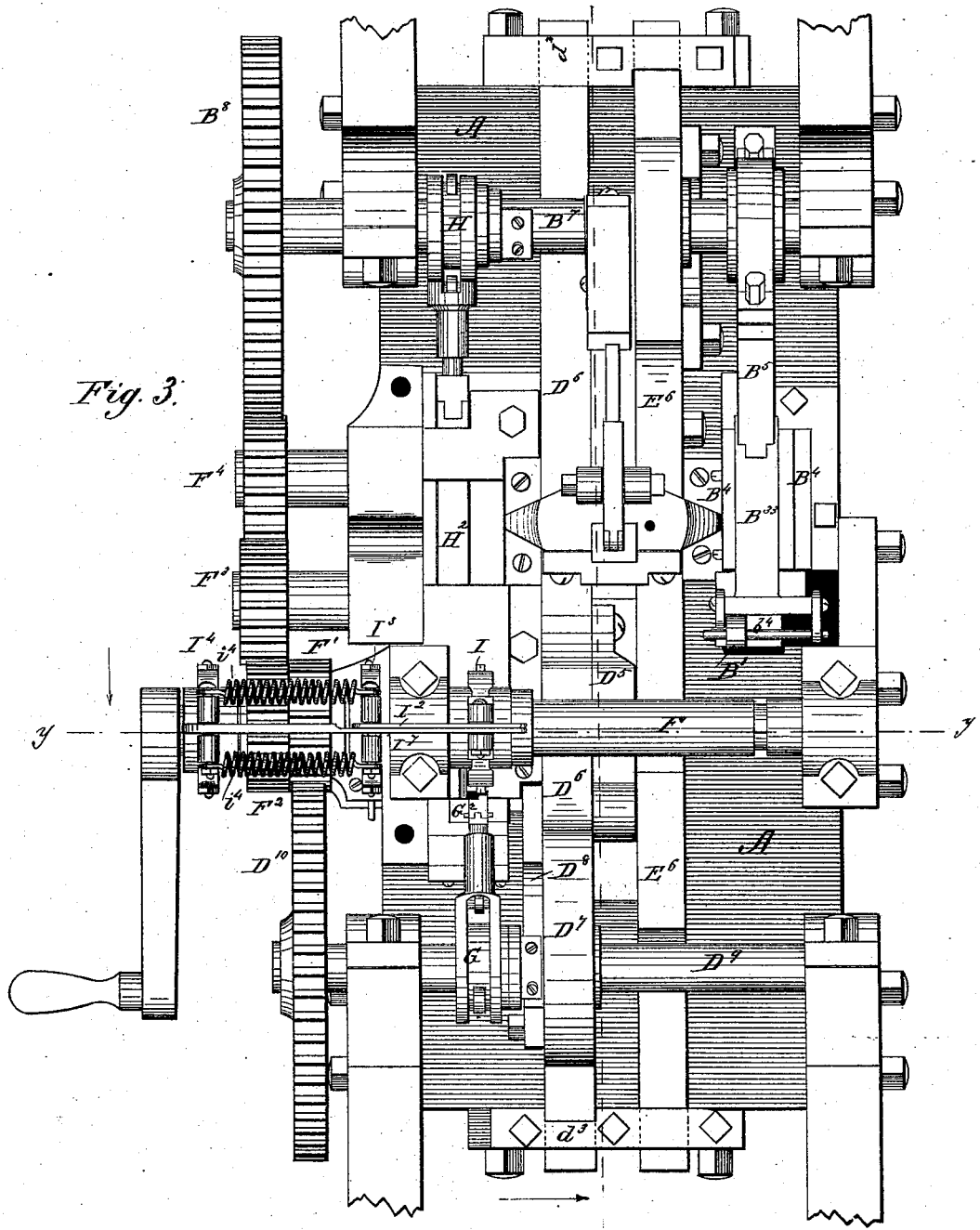
Figure 4:
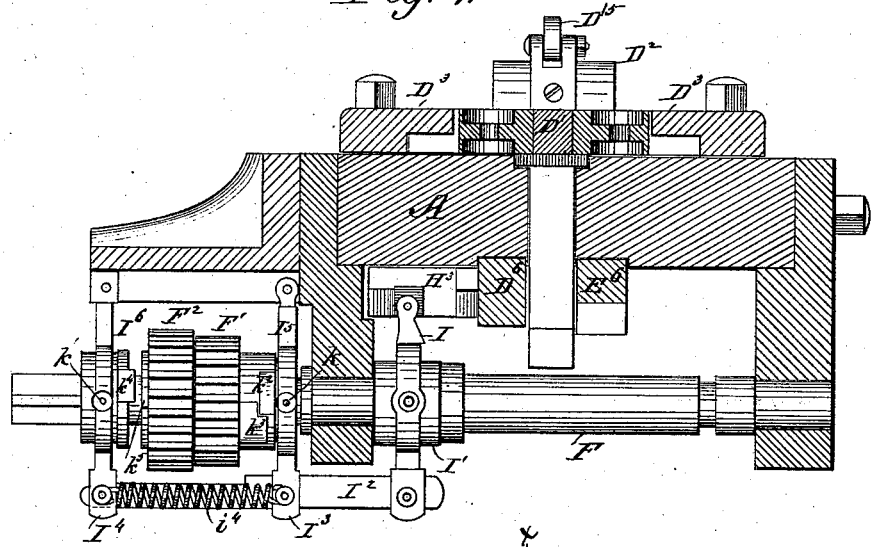
Figure 5:
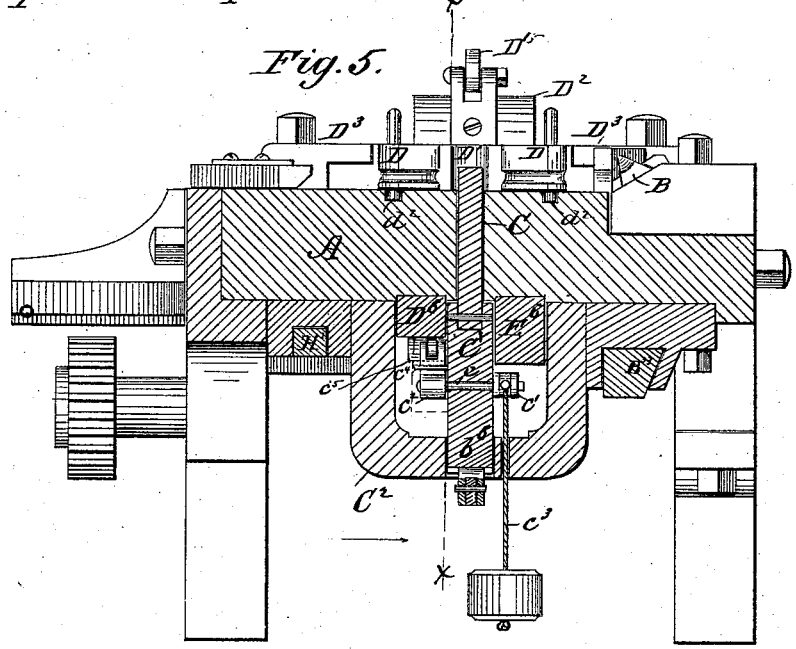
Figure 8:
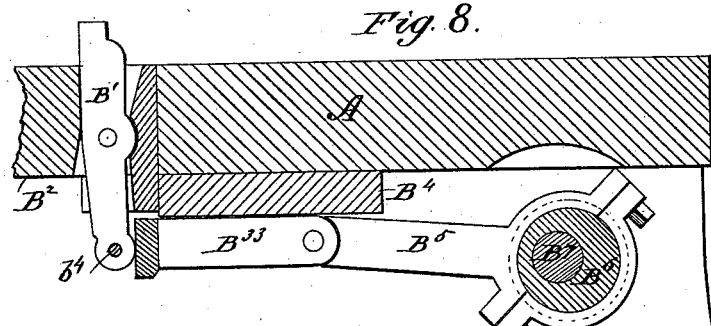
Figure 9:
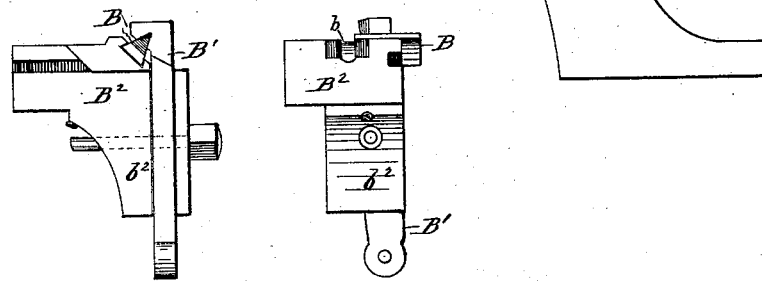
Figure 10:
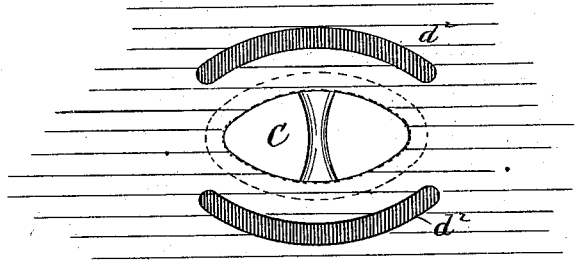

Figure 1 is a plan or top view of the machine. Fig 1ª is a face view of the nipping-jaws and swage-block. Fig. 2 is a vertical longitudinal section through the line $x\,x$ of Figs. 1, 3, and 5. Fig. 3 is an inverted plan or underneath view. Fig. 4 is a vertical transverse section through the line $y\,y$ of Figs. 1 and 3. Fig. 5 is a vertical transverse section through the line $z\,z$ of Figs. 1 and 2. Fig. 6 is a sectional plan, and Fig. 7 an inverted vertical section, of the cam mechanism for shifting the clutches. Fig. 6ª is a further detail of the same device. Fig. 8 is a longitudinal sectional view, showing the means for working the shear; and Fig. 9 shows details of the shear, shear-block, and actuating-lever. Fig. 10 is a plan view of a modification of the former and table.

My invention is designed to provide a machine which shall cut from a rod of metal a section with tapered ends and bend it around in oval form, to constitute a complete link, with the exception of uniting the two tapered ends, which are subsequently welded together. My invention comprises means for effecting these operations in regular order, which I will now proceed to describe.

To avoid confusion I will first describe those parts of the machine which work above the table, and operate directly upon the material forming the link, and then after this I will describe the particular construction of each of these several features and their arrangement with respect to their driving parts.

Referring now to those parts that directly operate upon the link and rest above the table, and which are best shown in Figs. 1 and 2, A represents the table, which is made of metal, and above which are arranged the four principal parts of the machine: first, the shear B, which cuts off a section of the rod of metal from which the links are made; secondly, a rising-and-falling former, C, around which the cut section of material is bent, to give it the form of the link; thirdly, a pair of advancing and receding jaws, D D, and abutment-block D', which first bend the link-section around the former; and, fourthly, a pair of nipping-jaws, E, and swaging-block E', which bend the ends of the U-shaped piece inwardly, and swage them together, ready for welding.

The shear B is in the nature of a short heavy knife, having its cutting-edge inclined to the vertical, and moving longitudinally with the table, its motion being derived from the oscillation of a lever, B', which is operated from beneath the table, as hereinafter described, and whose upper end rises through a slot in the table, and is seated in a notch in the shear. This shear slides over the channel $b$ in block $B^2$, through which the stock-rod is fed, and moves onto the inclined face-plate $b'$, whose edge is sharp, and co-operates with the shear in cutting off the section of rod for the link. This face-plate $b'$ is attached to the block $B^2$, which latter is made adjustable to or from the longitudinal line of the former C by means of one or more slots and set-screw $b^3$, so as to regulate the length of the link-section cut to correspond with the size of the link to be made.

The object in arranging the shear so as to cut the rod obliquely is to make the section which is cut off for the link to have two tapered ends, to facilitate the fitting together of the same in making the weld.

On the opposite side of the former C from the shear, and on the same transverse line and at an equal distance from the former, is a gage, $B^3$. The face of this gage which is next to the former is inclined to fit the taper of the rod-section cut off, and said tapered face, when struck by the tapered end of the rod as it is pushed through, keeps the rod in proper position and prevents it from becoming turned or twisted, so that the shear is made to sever the link-section in a plane exactly parallel to the cut previously made. This gage is slotted and connected to the table by set-screws, and it must be exactly the same distance from the line of the former that the shear is, so that in varying the length of the link, for any adjustment of the block carrying the shear to or from the former, a corresponding adjustment must be made for the gage.

The former C is made of the exact shape of the interior of a link, and it moves up and down in a corresponding slot in the table, being held, by mechanism hereinafter described, above the table while the link is being formed, and dropping down after the link is formed to a position below or on a level with the table, to permit the link to be removed.

D D is the first pair of bending-jaws, and D' is an abutment-block between them. These give the first bend to the cut section of rod as it lies transversely on the table between the shear and the gage, and they take said section and force it directly against the former, which strikes it in the middle. Both the jaws D D and the abutment-block D' are attached to a sliding carriage, $D^2$, which moves on the top surface of the table in longitudinal direction between the undercut guides $D^3 D^3$. This carriage derives its reciprocating motion from the oscillation of a lever, $D^4$, which is operated by mechanism beneath the table, as hereinafter described, and whose upper end rises through a slot in the table and plays in a recess in the carriage $D^2$. Said lever has upon one side a friction-roller, $d$, (see Fig. 2,) which bears against the carriage in its forward movement, and on the other side is jointed to a bent arm, $D^{15}$, which passes over the end of the lever and is jointed to the carriage, and against which bent arm the lever pulls on the back movement to draw the carriage back. The abutment-block D' is concaved in front to fit the end of the link, and the jaws D D are also grooved to fit the link, and jointed on each side of the abutment-block to the carriage by vertical bolts, and near their front ends have each a pin or lug, $d'$, on its under side, which travels in an arc-shaped groove, $d^2$, in the top of the table, and which pin and groove serve, as the carriage moves forward, to close the jaws in an embrace about the former, and to bend the two ends of the link-section toward the former into a U shape.

E E, Fig. 1, are the nipping-jaws, and E' the swaging-block, for bending together the two ends of the partially-formed link. These parts are arranged on the opposite side of the former from the first bending-jaws, and they have a reciprocating motion in line with the same. The jaws E and block E' are attached to a carriage, $E^2$, which slides on the surface of the table, and is controlled in direction by the undercut guides $E^3 E^3$. Motion is given to this carriage by a lever, $E^4$, Figs. 1 and 2, which is driven by mechanism under the table, which I will describe hereinafter, and which lever rises through a slot in the table and plays in a recess in said carriage. This lever has on one side a friction-roller, $e s$, which bears against the carriage on the forward motion, and on the other side said lever is jointed to a bent arm, $E^{15}$, which passes over the end of the lever, and is jointed to the carriage, and upon which arm the lever pulls in drawing the carriage back.

The function of the nipping-jaws E E is as follows: When the link has been bent into U shape by the first bending-jaws, the two ends project straight toward the nipping-jaws E, and these ends must receive an initial bend inward before they strike the swaging-block E', or otherwise the ends of the U-shaped piece would be as apt to bend outwardly as inwardly. To give an initial bend inward to the ends of the partially-formed link is the function of these nipping-jaws, and their action is, on the inward movement of the carriage $E^2$, to move quickly together and nip or bend in the ends of the U-shaped link-piece before they strike the abutment-block, and then move outward and rest against the sides of the link, holding it firm while the now inturned ends are being lapped and swaged by the swaging-block E'. To facilitate this action the swage-block E' has two horizontal grooves, $e e'$, in it, (see Fig. 1$^a$,) and the jaws E E have each a groove, $e^2$ $e^3$, in their inner faces, one of which, $e^2$, runs up into the upper groove, $e$, of the swage-block, and the other of which, $e^3$, runs into the lower groove, $e'$, of the swage-block. These grooves fit the path that the ends of the link-piece are intended to travel in, lapping past each other. For giving the necessary movement to the nipping-jaws, the latter are jointed to the carriage on each side of the abutment-block, and have shanks that extend through recesses in the carriage to a point in rear of the same, where they are provided with jointed toggle-arms $E^{16} E^{16}$, which have shoulders $e^4$, which strike against a lug, $e^5$, on a central bar, $E^{17}$, so that when the carriage moves forward the shoulders $e^4$ on the toggle-arms strike the lug $e^5$, and the thrust of the toggle-arms outward throws the shanks or rear ends of the jaws apart, as shown in dotted line, Fig. 1, and consequently closes the front ends of the nipping-jaws upon the ends of the link-piece. As the carriage moves forward, the lug $e^5$ slips past the shoulders $e^4 e^4$, and the jaws E open again and yield to the sides of the link as the latter moves up against the same. To make the action of the nipping-jaws quick, (see Figs. 1 and 2,) the toggle-arms $E^{16}$ are thrown out, not only by the forward motion of the carriage, but the bar $E^{17}$, which carries the lug $e^5$, is given at the same moment a backward movement by being connected to a block, $E^{18}$, which is moved by the slide-rod underneath the table, hereinafter described. When the carriage is moved back again, the lug $e^5$ on bar $E^{17}$ is raised over the shoulders $e^4$ of the toggle-arms by a teat or projection, $e^6$, on the bottom of bar $E^{17}$, which teat, on the reverse (or forward) movement of the bar, strikes a projection, $e^9$, Fig. 2, and raises the bar $E^{17}$ on its pivot, so that the lug $e^5$ may pass over the toggle-arms and get a new hold in front of the same. To cause this lug to drop down in front of the shoulders, a spring, $e^8$, may be placed under the rear end of bar $E^{17}$; or the lug $e^8$ may be made large enough to constitute a weight which acts of its own gravity.

Now, in describing the conjoint operation of the parts as so far referred to, the rod $r^2$, from which the link is cut, is fed across the table to the gage, and is cut off by the shear. Then the bending-jaws D D and block D' move forward and bend the cut-off section around the former into a U shape, as shown in dotted lines, and then stop; and, next, the nipping-jaws E E and swaging-block move inwardly and bend the ends inwardly and lap them past each other. Then the first bending-jaws, D, recede or move back, then the former drops down and allows the link to be removed, and then, at the same time that the nipping-jaws and swaging-block move back, the shear comes forward and cuts off another section for a new link.

I will now proceed to describe the means for transmitting power to the several working parts above the table, beginning with the shear B. This shear is, as before stated, operated by a lever, B', Figs. 1, 3, 8, 9, and this lever is fulcrumed in a recess in a lower pendent portion, $b^2$, Fig. 9, of the block $B^2$, which lower pendent portion of the block is offset from the block $B^2$, and has a solid bearing against the solid metal of the table in the plane in which the lever works, so that the lever, when under the working-strain in cutting off the rod, shall find a solid and firm backing for its fulcrum. While this is the case, however, the block $B^2$, carrying the shear, is made adjustable in the table to or from the former for varying the size of links, as shown in Fig. 1. The lower end of lever B' is jointed by a long bolt, $b^4$, Figs. 3 and 8, to the head of a slide, $B^{33}$, and this slide works horizontally in longitudinal position beneath the table in guides $B^4 B^4$, and is in turn jointed to a strong eccentric-rod, $B^5$, whose bow or yoke encircles an eccentric, $B^6$, on one of the main transverse shafts $B^7$, which is journaled in bearings under the table. The object in using the long bolt $b^4$ is to permit the lever to move with the block $B^2$ in adjusting this to the size of link-section, and still preserve its connection with its driving mechanism. For the working-strain, however, the head of the slide $B^{33}$ bears directly against the lower end of the lever, so that strain does not come on the bolt $b^4$, but the latter is only used for drawing the shear back after it has done its work.

For operating the carriage $D^2$, which carries the first bending-jaws, a lever, $D^4$, Figs. 1 and 2, is connected therewith, as before described, and is fulcrumed in the table, so as to work in a vertical plane, and underneath the table it is jointed to a link, $D^5$, which in turn is jointed to a horizontal slide-bar, $D^6$, which is arranged in longitudinal position beneath the table, and slides in bearings $d^3$ $d^3$. This bar $D^6$ has a yoke, $D^7$, Fig. 3, at one end, in which revolves a cam, $D^8$, on a main transverse shaft, $D^9$, by whose revolution a reciprocating motion is imparted to the slide-bar $D^6$, and the necessary motion imparted to carriage $D^2$ through lever $D^4$ and link $D^5$. The relation of the yoke $D^7$, cam $D^8$, bar $D^6$, and shaft $D^9$ is not very clearly shown in Fig. 3; but it is the same as that occupied by the corresponding parts, $E^6$, $E^7$, $E^8$, and $B^7$ in Fig. 2.

The former C (see Figs. 2 and 5) is connected to a block, C', under the table, the lower end of which block is reduced in size to form a bearing, $b^6$, which slides vertically in a stirrup-shaped support, $C^2$, fastened to and suspended from the table. In the block C' is a short horizontal rock-shaft, $c$, having on one side of the block a crank-arm, $c'$, and on the other a crank-arm, $c^2$.

To the crank-arm $c'$ is attached a weighted chain, $c^3$, whose tension holds the other crank-arm, $c^2$, against a stop-pin, $c^4$, so that this arm $c^2$ can move about its center in one direction, but cannot move in the other. This crank-arm $c^2$ projects upwardly and bears a friction-roller, which is struck by a downwardly-projecting cam, $c^5$, on the slide-bar $D^6$. (Shown in dotted lines in Fig. 2 and full lines in Fig. 5.) This cam, in one movement of the slide-bar $D^6$, (when moved to the right in Fig. 2,) strikes arm $c^2$, and, pressing it against its stop-pin $c^4$, causes the block C', which is connected to it, to be drawn down, and this brings down the former C to allow the link to be removed. On the reverse movement of the slide-bar $D^6$ its cam $c^5$ turns the arm $c^2$ and its shaft against the tension of the weight on the chain, and thus said cam passes by to its first position, for depressing the former a second time. To throw the former up again after it is depressed, a lever, $C^3$, is fulcrumed to the bottom of the stirrup-like support $C^2$, and is provided at one end with a heavy weight, $C^4$, while its other or upper end is made with an articulated toe, $C^5$, that bears against the bottom $b^6$ of the former-block, where it projects through the stirrup. This weighted lever would, it will be seen, at once raise the former after it is depressed, and thus leave no time for the removal of the link. Now, to make the former remain down a sufficient length of time, the weight $C^4$ of the lever $C^3$ is provided with a spring catch or bolt, $c^6$, which, when the weight is raised and the former is down, catches over a cleat or flange, $c^7$, on the yoke $E^7$, and which holds the weight, and does not allow it to throw the former up until said yoke reaches a certain position in the timing of the parts, which thus keeps the former down and leaves ample time for the removal of the link, after which the movement of the yoke $E^7$ allows the weight to drop and the former to rise.

For operating the carriage $E^2$, which carries the nipping-jaws and swaging-block, the lever $E^4$ extends up through the table and connects therewith. This lever is fulcrumed on the table to work in a vertical plane, and after passing below the table is jointed to a link, $E^5$, which in turn is jointed to a slide-bar, $E^6$, which runs horizontally beneath the table, and is held in bearings $e^3\ e^3$. At one end this slide-bar $E^6$ is provided with a yoke, $E^7$, in which revolves a cam, $E^8$, fixed in the main shaft $B^7$.

Now, in the timing of the machine it is necessary that the carriage $D^2$, which carries the bending-jaws and abutment-block, should advance to its position and then stop, and that the carriage $E^2$, which carries the nipping-jaws and swage-block, should advance to its position, and then stop, so that the two main shafts $D^9$ and $B^7$, which operate the two carriages, must have an alternate revolution, one being active while the other is at rest, and vice versa.

Both the shafts $D^9$ and $B^7$ are driven from a main drive-shaft, F, which bears two pinions, $F'\ F^2$, Figs. 3 and 4, one of which, $F'$, engages directly with a gear-wheel, $D^{10}$, on shaft $D^9$, and the other of which pinions, $F^2$, imparts motion to the gear-wheel $B^8$ on shaft $B^7$ through the two idle-pinions $F^3\ F^4$.

I will now proceed to describe how the two shafts $D^9$ and $B^7$ are alternately rotated, one being active while the other is at rest. Both these shafts are provided with a cam mechanism, G H, Figs. 3, 6, and 7, whose particular construction I will hereinafter describe, and each of which is connected to a rod, $G'$ and $H'$, Figs. 6 and 7, which in turn are jointed to slide-bars $G^2\ H^2$, which slide in guides beneath the table. These slide-bars terminate in the same transverse line beneath the table and at a point just above the main drive-shaft F. One of these slide bars, $G^2$, Fig. 6, is offset near its inner end, and the ends of both are beveled at an angle of forty-five degrees, and made to bear against corresponding bevel-faces of a shifting block, $H^3$, which slides at right angles to the slide-bars, or transversely to the table. This shifting block $H^3$ is provided with a central shank portion of reduced size, which is embraced by the forked end of a lever, hereinafter described. This shifting block is alternately struck and moved by the slide-bars driven by the two shafts $D^9$ and $B^7$, and the shifting movement of said block is made to control a clutch mechanism which alternately connects the main shaft F first to one shaft, $D^9$, and then to the other, $B^7$. Before proceeding to describe this clutch mechanism, however, it will be necessary to more particularly describe the cam mechanisms G and H, which are located on the two shafts $D^9$ and $B^7$, for moving the shifting block.

The necessity for a peculiar kind of cam mechanism G and H grows out of this fact, that when one slide-bar, $G^2$, drives the shifting block one way, that cam which actuated that slide-bar must get past the dead-center and get out of the way, so that when the other slide-bar, $H^2$, moves inward, the shifting block can push back the bar $G^2$ and rod $G'$ in response to the alternate pressure of bar $H^2$, or otherwise the shifting block would not move. Both the cam mechanisms G and H are constructed in the same manner for accomplishing this result, and it will therefore only be necessary to describe one of them.

Referring to the mechanism marked G, the letter $g$ indicates a double yoke or strap that embraces the shaft $D^9$, and which yoke has a tubular sleeve, in which slides the rod $G'$, which actuates the slide $G^2$. This rod, on the end next to the shaft, has a friction-roller that is struck by a cam-wheel, $g'$, (of which there are two arranged diametrically,) located on a loose collar, $g^2$, encircling the shaft $D^9$, and lying between it and the double strap or yoke $g$. This collar $g^2$ is arranged to be turned by the shaft $D^9$, and when its cam-wheels $g'$ strike against the end of the rod $G'$ they project said rod, and also the slide-bar $G^2$, and cause the latter to move the shifting block. When the rod $G'$ is moved to its farthest point by the cam-wheel $g'$, the latter must not stop on the dead-center, but must continue on past the end of rod $G'$. To accomplish this result the collar $g^2$ is arranged loose on the shaft $D^9$ for a limited rotary play, and then a lug, $g^3$, connected with the shaft, strikes a lug, $g^4$, on the collar and gives a positive movement to the collar, that causes its cam-wheel to be carried against the rod $G'$, to force it outwardly. Then when the cam-wheel has pushed the rod as far as its throw will permit, a coil-spring, $g^5$, fixed about the shaft, bears against the collar and throws it farther forward, thus carrying the cam-wheel over the dead-center and entirely past the end of rod $G'$, so that the latter can be pushed back by the shifting block in its next movement.

That the action of the spring $g^5$ may be better understood, it will be perceived that its clutch end rests between the rigid lug $g^3$ of the shaft and the shoulder $g^4$ of the collar, and when the rotary strain of shaft $D^9$ is imparted to collar $g^2$, the spring $g^5$ first bears against the shoulder $g^4$, and is put under tension while the lug $g^3$ is advancing to shoulder $g^4$, so that after cam-wheel $g'$ has projected rod $G'$, this tension of spring $g^5$ asserts itself, to throw the collar $g^2$ a little farther. Instead of using a spring $g^5$ for this purpose, a weight may be arranged to perform the same service.

I will now describe how the movement of the shifting block is made to connect the main shaft F alternately with the shafts $B^7$ and $D^9$.

The shifting block $H^3$, Fig. 6, has its reduced shank fitted between the forked end of a lever, I, Fig. 4, which is made in ring shape, and passes around shaft F, and is fulcrumed in its middle to a swiveling collar, $I'$, on said shaft. The opposite or lower end of the lever I has a link-connection, $I^2\ I'$, Figs. 3 and 4, with two other ring-shaped levers, $I^3\ I^4$, which are jointed at their upper ends to an offset from the table, and which ring-shaped levers have pins $k$ $k'$ that travel in circumferential grooves in the clutch-sections $I^5$ $I^6$, which are arranged on opposite sides of the two pinions $F'$ $F^2$. These pinions are loose on the shaft F, while the two clutch-sections $I^5$ $I^6$ are fixed to the shaft by a feather or key, so as to revolve rigidly with said shaft, but have a longitudinal adjustment thereon. The clutch-section $I^5$ has a lug, $k^2$, that is adapted to engage with the lug $k^3$ of the pinion $F'$, and the clutch-section $I^6$ has a lug, $k^4$, that is adapted to engage with a lug, $k^5$, on the pinion $F^2$, and these two clutch-sections are so coupled by the link-connection $I^2$ $I^7$ that when clutch-section $I^5$ is coupled to pinion $F'$ clutch-section $I^6$ is away from or uncoupled from pinion $F^2$. It will therefore be perceived that the shifting block $H^3$, by its movement of ring-shaped lever I and link-connection $I^2$ $I^7$, alternately imparts motion from main shaft F first to shaft $D^9$ through pinion $F'$ and wheel $D^{10}$, and then, breaking this connection, imparts motion through pinion $F^2$ and wheels $F^3$, $F^4$, and $B^8$ to the other shaft, $B^7$, thus giving the necessary alternate action for the devices above the table governed by these two shafts.

The means which I employ for shifting the clutch-sections $I^5$ $I^6$ is designed for a certain result which could not be accomplished by the ordinary clutch mechanism. The clutch-sections $I^5$ $I^6$, it will be seen, are not in the nature of ratchet-toothed crabs, but only a collar with offsetting lugs $k^2$ $k^4$, which strike against corresponding offsetting lugs, $k^3$ $k^5$, on the pinions. This I find the only form of clutch that will stand the constant use made of it without wearing and slipping. Now, it is necessary to prevent one of the lugs (the one on section $I^5$, for instance) from coming exactly opposite and striking the lug on the adjacent pinion in its longitudinal adjustment, because if this were to happen the clutch would not couple on that side and uncouple on the other. I have therefore devised special means for operating the said clutch-section, as follows:

The lever I has two link-bars, $I^2$ $I^7$, one of which, $I^2$, connects with the lever $I^3$, that works one clutch-section, and the other of which connects with the lever $I^4$, that operates the other clutch-section. These link-bars serve simply to throw the clutch-sections away from the pinion, said clutch-sections being thrown into the pinion by springs $i^4$. Now, if one of the lugs of the clutch-sections should, in the adjustment of the latter, strike against a lug on the pinion, the springs $i^4$ yield and allow the necessary movement to uncouple the other pinion, and as soon as the shaft makes a little movement the abutting lugs pass the one off of the other, and the springs draw them into engagement.

I make the former C separable from its block C', as in Fig. 5, so that different sizes of formers may be used with the same machine, and with such change in the former the abutment-block D' and swage-block E' must be removed and new ones (longer or shorter) substituted for them, to correspond with the change in the former.

As shown, the form of link which the machine is designed to make is an oblong link with parallel sides. In making a link of a more circular or oval shape, as in Fig. 10, I may entirely dispense with the nipping-jaws E E by making the grooves $d^2$ $d^2$ in the table to correspond with the curve of the former, in which case the bending-jaws D D bend the link around the former, and also turn in the ends sufficiently for the swage-block to finish it. In making links of this shape, also, it is sometimes desirable to have a cast-iron transverse brace in the link. This brace may be easily set in the link while being formed, as in Fig. 10, by simply making a transverse slot in the former to receive the cast-iron brace while the link is being bent around.

Having thus described my invention, what I claim as new is—

1. In a link-machine, a table with a rising-and-falling former, C, around which the link is bent, combined with abutment-block D', bending-jaws D D, and a swage-block on the opposite side of the former, said abutment-block and jaws on the one hand and the swage-block on the other having a reciprocating movement, substantially as described.

2. The combination, with the table having a rising-and-falling former, C, and grooves $d^2$ $d^2$ in the surface of the table, at the sides thereof, of the reciprocating bending-jaws having pins or lugs moving in said grooves for controlling the movement of the jaws, substantially as described.

3. The combination, with the rising-and-falling former C, of the reciprocating abutment-block D', with bending-jaws D D, the swage-block E', and the nipping-jaws E E, jointed to the swage-block, and arranged, as described, to nip or bend in the ends of the partially-formed link just before the swage-block strikes it, as described.

4. The combination of the rising-and-falling former C, the shear B and gage $B^3$, the reciprocating abutment-block and bending-jaws D' D D, and the reciprocating swage block E' and nipping-jaws E E, substantially as shown and described.

5. The combination of the shear B, adjustable block $B^2$, having pendent offsetting section $b^2$, the actuating-lever B', fulcrumed therein, the long bolt $b^4$, the slide $B^{33}$, eccentric-rod $B^5$, eccentric $B^6$, and the main transverse shaft $B^7$, substantially as shown and described.

6. The combination, with the recessed carriage $D^2$, carrying the abutment-block and bending-jaws, and located above the table, of a lever, $D^4$, extending below the table and arranged to work in a vertical plane, and having its upper end arranged in the recess of the carriage, the bent arm $D^{15}$, jointed to the carriage and extending over the end of the lever, the link $D^5$, jointed to the lever below the table, the slide-bar $D^6$, arranged in bearings or guides under the table, and having a yoke, $D^7$, and the main shaft $D^9$, with cam $D^8$, substantially as shown and described.

7. The combination, with the table, of the former C and former-block C', the arm $c^2$, arranged on the former-block, and articulated for movement in one direction and rigid in the other, the slide-bar $D^6$, having cam $c^5$, and a weighted lever for raising said former-block, as shown and described.

8. The combination, with the former and its block and means for depressing it, substantially as described, of a weighted lever for elevating it, having a spring-bolt, and the yoke $E^7$, having a catch for said bolt to hold the former down after the depressing-cam has passed the former-block, as set forth.

9. The combination of the slide-bar $D^6$, having cam $c^5$, the former C and block C', the rock-shaft $c$, having arms $c'$ $c^2$, weighted chain $c^3$, stop $c^4$, stirrup $C^2$ and weighted lever $C^3$, substantially as shown and described.

10. The combination of the carriage $E^2$, carrying swaging-block and jaws E' E E, and recessed in the rear, of the bent arm $E^{15}$ and lever $E^4$, the link $E^5$, slide-bar $E^6$, having yoke $E^7$, and shaft $B^7$, with cam $E^8$, substantially as shown and described.

11. The combination, with the two shafts $D^9$ and $B^7$, controlling the two principal moving parts of the machine, of the cam mechanism G H, rods G' H', slide-bars $G^2$ $H^2$, terminating in bevel faces, the bevel-faced shifting block $H^3$, moving at right angles to the slide-bars $G^2$ $H^2$, and mechanism for causing the motion of the shifting block to alternately couple the shafts $B^7$ and $D^9$ to a main drive-shaft, F, substantially as set forth.

12. The cam mechanism G and H, consisting of a shaft, $D^9$, the yoke $g$, having tubular sleeve, rod G', sliding therein, the loose collar $g^2$, with limited rotary play, located between the yoke and the shaft, and bearing cam-wheels $g'$ $g'$, and a coil-spring, $g^5$, or its equivalent, for throwing the cam-wheel over the dead-center when it projects the rod G', as and for the purpose described.

13. The combination, with the shifting block $H^3$, of the lever I, independent links $I^2$ $I^7$, levers $I^3$ $I^4$, with pins $k$ $k'$, clutch-section $I^5$ $I^6$, loose pinions $F^7$ $F^2$, springs $i^4$, and the gears connecting said pinions with their respective shafts, substantially as described.

14. The detachable former C, combined with the former-block C', the table, the swage-blocks D' E', and the bending and nipping jaws D and E, as and for the purpose described.

15. The combination, with the carriage $E^2$ and the nipping-jaws E E, of the toggle-arms $E^{16}$, with shoulder $e^4$, bar $E^{17}$, with lug $e^5$, projection $e^6$, and means for operating the carriage and the bar $E^{17}$, substantially as shown and described.

The above specification of my invention signed by me in the presence of two subscribing witnesses.

CHAS. O. SOBINSKI.

Witnesses:
ANTON MEYER,
EDW. W. BYER.